US012609544B2

(12) United States Patent
Choi

(10) Patent No.: US 12,609,544 B2
(45) Date of Patent: Apr. 21, 2026

(54) POWER SUPPLY CONTROL DEVICE AND METHOD FOR CONTROLLING SAME

(71) Applicant: LG Energy Solution, Ltd., Seoul (KR)

(72) Inventor: Hojin Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/859,661

(22) PCT Filed: Oct. 30, 2023

(86) PCT No.: PCT/KR2023/017019
§ 371 (c)(1),
(2) Date: Oct. 24, 2024

(87) PCT Pub. No.: WO2024/150905
PCT Pub. Date: Jul. 18, 2024

(65) Prior Publication Data
US 2025/0286392 A1 Sep. 11, 2025

(30) Foreign Application Priority Data
Jan. 11, 2023 (KR) ........................ 10-2023-0004053

(51) Int. Cl.
*H02J 7/00* (2026.01)
*B60L 3/00* (2019.01)
(Continued)

(52) U.S. Cl.
CPC .......... *H02J 7/0031* (2013.01); *B60L 3/0084* (2013.01); *B60L 3/0092* (2013.01); *B60L 3/04* (2013.01);
(Continued)

(58) Field of Classification Search
CPC .... H02J 7/0031; H02J 7/0063; H02J 2310/48; B60L 50/60; B60L 3/0084; B60L 3/04
See application file for complete search history.

(56) References Cited

U.S. PATENT DOCUMENTS

2012/0223677 A1 9/2012 Yamauchi et al.
2013/0338871 A1* 12/2013 Kubo ...................... B60L 58/18
701/29.2
(Continued)

FOREIGN PATENT DOCUMENTS

EP 4096052 A1 11/2022
EP 4335681 A1 3/2024
(Continued)

OTHER PUBLICATIONS

International Search Report for Application No. PCT/KR2023/017019 mailed Feb. 20, 2024. 3 pgs.
(Continued)

*Primary Examiner* — Daniel Cavallari
*Assistant Examiner* — Duc M Pham
(74) *Attorney, Agent, or Firm* — Lerner David LLP

(57) ABSTRACT
A power supply control apparatus, located in a battery system which supplies power to a driving device, including: a switching device disposed on a power supply path between the battery and the driving device to electrically connect or disconnect the battery and the driving device; a main controller configured to control whether the battery should supply power to the driving device or not by controlling the switching device; and an auxiliary controller configured to control the switching device instead of the main controller in the instance that an abnormality occurs in the main controller.

12 Claims, 5 Drawing Sheets

(51) Int. Cl.
 B60L 3/04 (2006.01)
 B60L 50/60 (2019.01)
(52) U.S. Cl.
 CPC ............ B60L 50/60 (2019.02); H02J 7/0063
 (2013.01); H02J 2310/48 (2020.01)

(56) References Cited

U.S. PATENT DOCUMENTS

| | | | |
|---|---|---|---|
| 2019/0237980 A1 | 8/2019 | Yang | |
| 2020/0209321 A1* | 7/2020 | Min ..................... | H02J 7/0031 |
| 2021/0104902 A1 | 4/2021 | Yamauchi et al. | |
| 2022/0376489 A1* | 11/2022 | Kim ..................... | H02J 7/0031 |
| 2023/0331091 A1 | 10/2023 | Choi et al. | |

FOREIGN PATENT DOCUMENTS

| | | | |
|---|---|---|---|
| JP | 2008206288 A | 9/2008 | |
| JP | 2012-182911 A | 9/2012 | |
| JP | 2014003742 A | 1/2014 | |
| JP | 2019161991 A | 9/2019 | |
| KR | 20160073109 A | 6/2016 | |
| KR | 2018-0009569 A | 1/2018 | |
| KR | 101855092 B1 | 5/2018 | |
| KR | 2019-0130901 A | 11/2019 | |
| KR | 2020-0051394 A | 5/2020 | |
| KR | 2022-0130516 A | 9/2022 | |
| KR | 102452596 B1 | 10/2022 | |
| WO | 2022241800 A1 | 11/2022 | |

OTHER PUBLICATIONS

Extended European Search Report including Written Opinion for Application No. 23916388.4 dated Sep. 9, 2025. 10 pages.

* cited by examiner

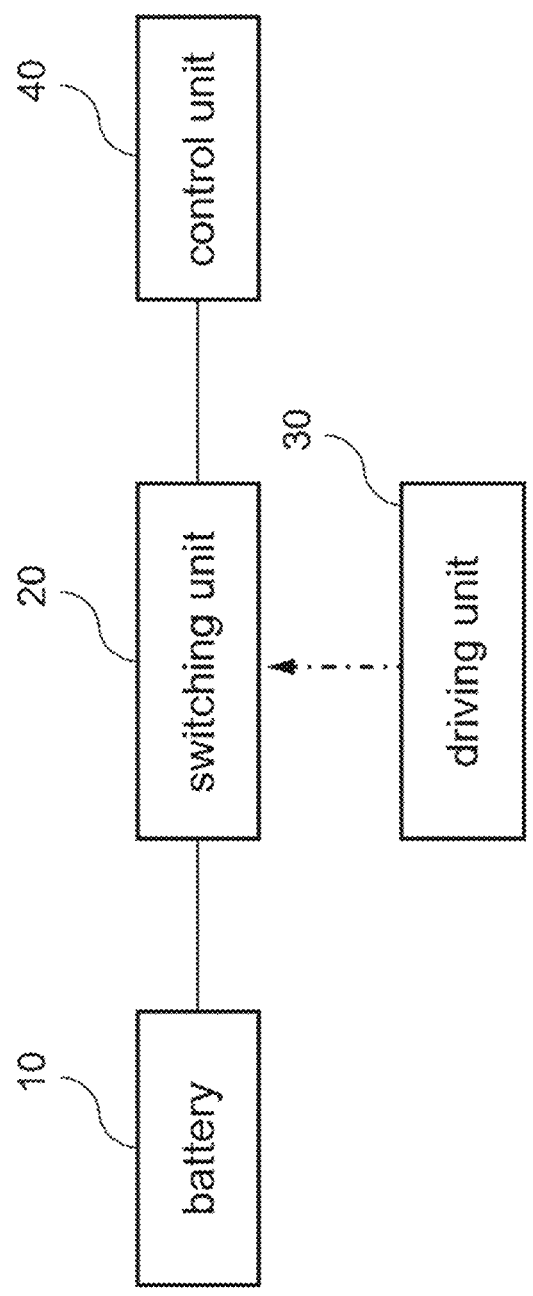
[Figure 1]

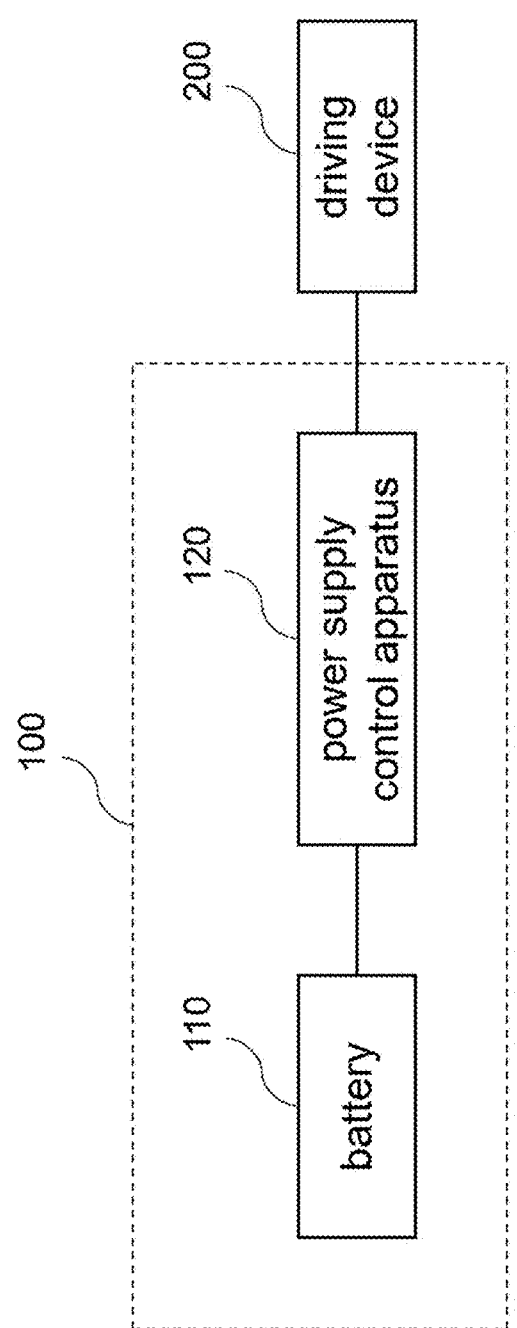
[Figure 2]

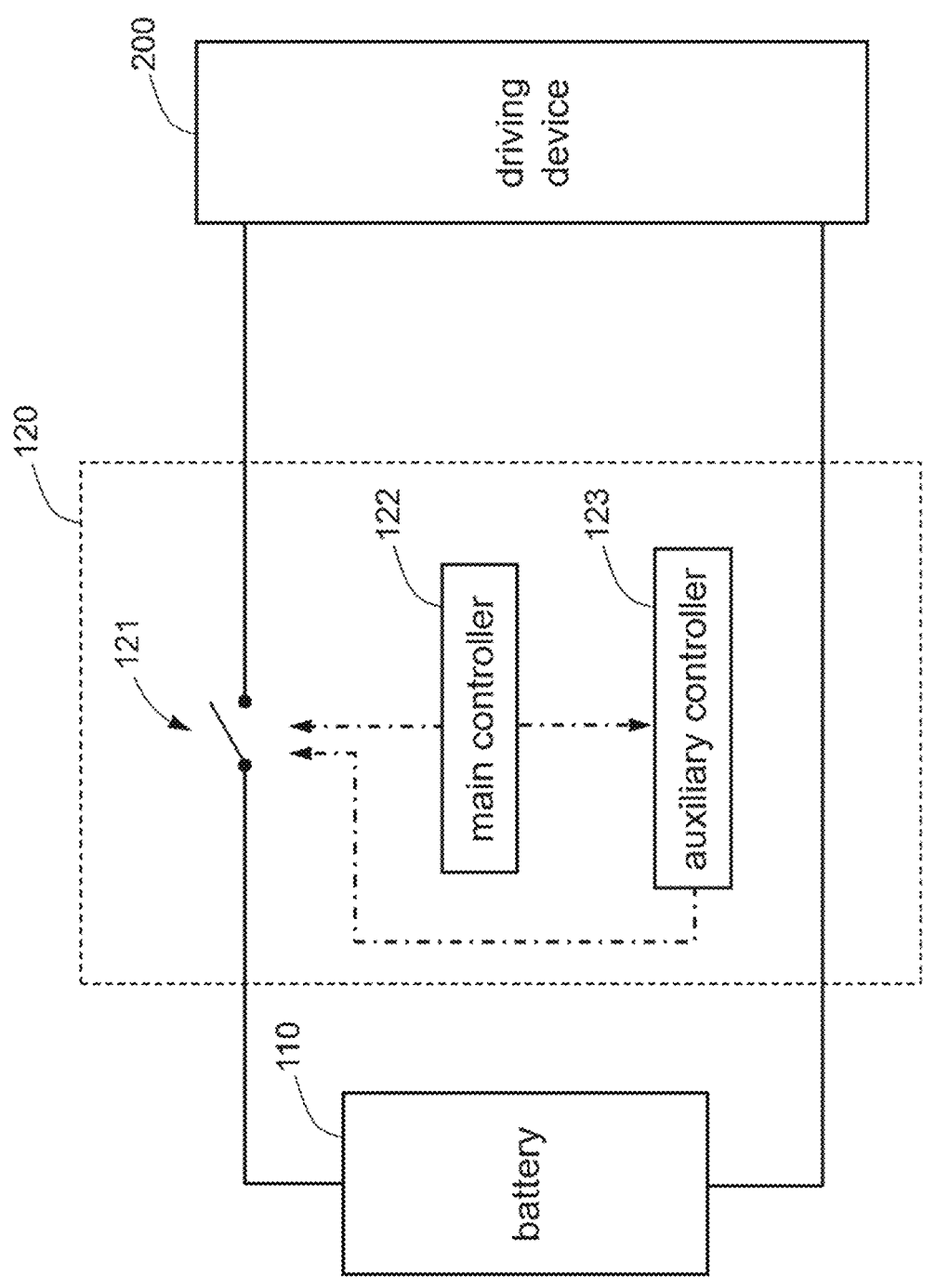
[Figure 3]

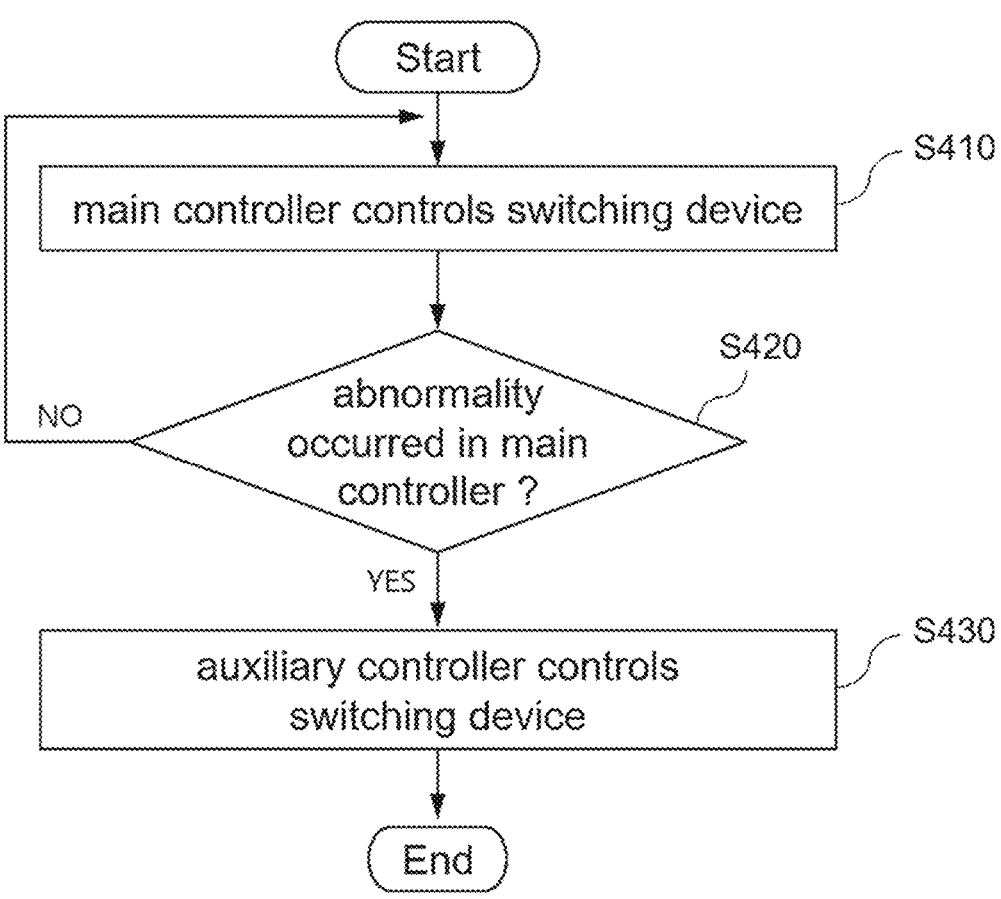
[Figure 4]

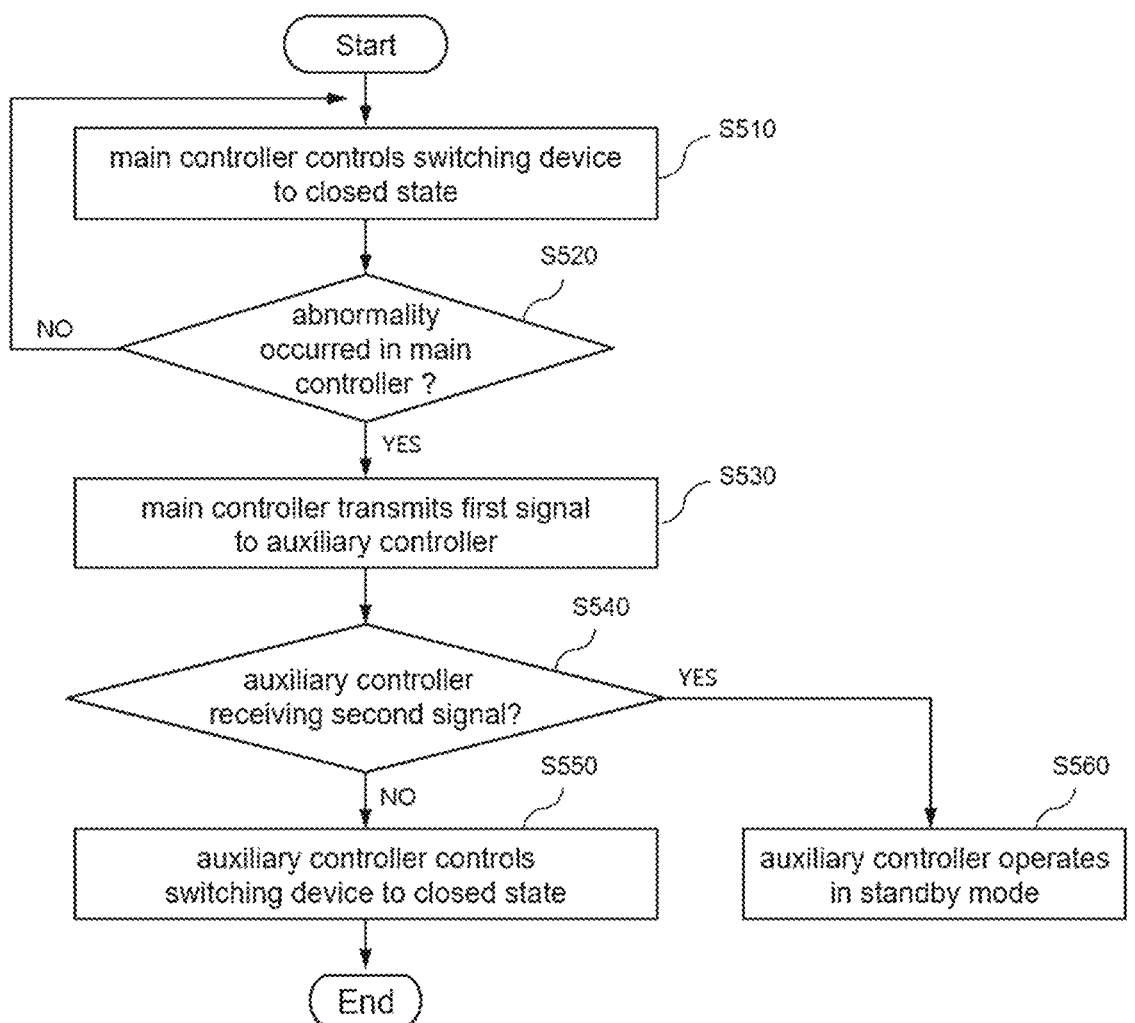
[Figure 5]

POWER SUPPLY CONTROL DEVICE AND METHOD FOR CONTROLLING SAME

CROSS-REFERENCE TO RELATED APPLICATIONS

This application is a national phase entry under 35 U.S. C. § 371 of International Application No. PCT/KR2023/017019 filed Oct. 30, 2023, which claims priority from Korean Patent Application No. 10-2023-0004053 filed Jan. 11, 2023, all of which are incorporated herein by reference.

BACKGROUND

Secondary batteries, capable of recharging and reuse, may be used as an energy source for small devices such as mobile phones, tablet PCs, and vacuum cleaners, for medium-to-large devices such as automobiles and energy storage systems (ESSs) for smart grids.

Secondary batteries may be used in the form of an assembly such as a battery module in which a plurality of battery cells are connected in series or parallel, or a battery pack in which a plurality of battery modules are connected in series or parallel, depending on the the system. In the case of medium-to-large devices such as electric vehicles, a high-capacity battery system with multiple battery packs connected in parallel may be applied to meet the capacity of a corresponding device.

Generally, a battery system applied to a device including a driving unit, such as an electric vehicle, includes a switching device disposed on a power supply path between the battery and the driving unit and a controller that controls the switching device. Here, through controlling the switching device, the stored power of the battery can be supplied or blocked to the driving unit.

In a process of driving the device equipped with this general battery system, if an unexpected abnormal condition (for example, abnormal reset or shutdown) occurs in the controller, power supply to the driving unit may be cut off, thereby causing the driving unit to suddenly stop and resulting in a safety accident.

To solve this problem, a solution is needed that can maintain power supply by the battery for a certain period of time so that the device can be stably stopped when an abnormal condition occurs in the controller of the switching unit.

BRIEF SUMMARY

Aspects of the disclosure provide a power supply control apparatus located in a battery system that supplies power to a driving device.

Aspects of the disclosure also provide a control method for the power supply control apparatus.

Aspects of the disclosure provide for a power supply control apparatus, located in a battery system which supplies power to a driving device, which includes: a switching device disposed on a power supply path between the battery and the driving device to electrically connect or disconnect the battery and the driving device; a main controller configured to control whether the battery should supply power to the driving device or not by controlling the switching device; and an auxiliary controller configured to control the switching device instead of the main controller in the instance that an abnormality occurs in the main controller.

In some examples, the main controller may further be configured to transmit a first signal for requesting emergency power supply to the auxiliary controller in the instance that an abnormal condition occurs in the main controller.

In some examples, the main controller may further be configured to output the first signal in the instance that an abnormal reset or shutdown occurs.

In some examples, the main controller may further be configured to transmit a second signal for canceling the request for emergency power supply to the auxiliary controller in the instance that the abnormal state is resolved after the first signal is transmitted.

In some examples, the auxiliary controller may further be configured to, upon receiving the first signal, control the switching device to a closed state for a predefined period to supply emergency power to the driving device.

In some examples, the auxiliary controller may further be configured to control the switching device to be in a closed state for a predefined period so that the auxiliary controller provides emergency power the driving device in the instance that a signal canceling the request for emergency power supply is not received from the main controller within a preset period of time after the first signal is received.

In some examples, the auxiliary controller may further be configured to operate in standby mode without outputting a control signal to the switching device in the instance that a signal canceling the request for emergency power supply is received from the main controller within a preset period of time after the first signal is received.

In some examples, the auxiliary controller may further be configured to control the switching device to be in a closed state until the driving device is normally stopped in the instance that an abnormal condition occurs in the main controller while the driving device is operating.

Aspects of the disclosure provide for a control method of a power supply control apparatus, including a switching device disposed on a power supply path between a battery and a driving device, a main controller for controlling the switching device, and an auxiliary controller, the method including: controlling, by the main controller, the switching device so that output power of the battery is supplied to the driving device; and controlling, by the auxiliary controller, the switching device instead of the main controller in the instance that an abnormality occurs in the main controller while the driving device is operating.

In some examples, the method may further include transmitting, by the main controller, a first signal for requesting emergency power supply to the auxiliary controller in the instance that an abnormal condition occurs in the main controller.

In some examples, the transmitting, by the main controller, the first signal for requesting emergency power supply to the auxiliary controller may include outputting the first signal in the instance that an abnormal reset or shutdown occurs.

In some examples, the method may further include transmitting, by the main controller, a second signal for canceling the request for emergency power supply to the auxiliary controller in the instance that the abnormal state is resolved after the first signal is transmitted.

In some examples, the controlling, by the auxiliary controller, the switching device may include, upon receiving the first signal, controlling the switching device to a closed state for a predefined period to supply emergency power to the driving device.

In some examples, the controlling, by the auxiliary controller, the switching device may include controlling the switching device to be in a closed state for a predefined period so that the auxiliary controller provides emergency power the driving device in the instance that a signal canceling the request for emergency power supply is not received from the main controller within a preset period of time after the first signal is received.

In some examples, the controlling, by the auxiliary controller, the switching device may include the auxiliary controller operating in standby mode without outputting a control signal to the switching device in the instance that a signal canceling the request for emergency power supply is received from the main controller within a preset period of time after the first signal is received.

In some examples, the controlling, by the auxiliary controller, the switching device may include controlling the switching device to be in a closed state until the driving device is normally stopped in the instance that an abnormal condition occurs in the main controller while the driving device is operating.

Aspects of the disclosure allow for, even if an unexpected abnormal condition occurs in a main controller that controls a switching device, maintaining power supply until the driving device is safely stopped, thereby improving safety of a device to which the battery system is applied.

BRIEF DESCRIPTION OF THE DRAWINGS

FIG. 1 is a block diagram for explaining a general power supply control device according to aspects of the disclosure.

FIG. 2 is a block diagram for explaining a power supply control apparatus according to aspects of the disclosure.

FIG. 3 is a block diagram for explaining a power supply control apparatus according to aspects of the disclosure.

FIG. 4 flowchart of the is an operational control apparatus method of a power supply control according to aspects of the disclosure.

FIG. 5 is an operational flowchart of a control method of a power supply control apparatus according to aspects of the disclosure.

DETAILED DESCRIPTION

The present disclosure may be modified in various forms and have various examples, and specific aspects thereof are shown by way of example in the drawings and will be described in detail below. It should be understood, however, that there is no intent to limit the disclosure to specific examples, but on the contrary, the disclosure is to cover all modifications, equivalents, and alternatives falling within the spirit and technical scope of the disclosure. Like reference numerals refer to like elements throughout the description of the figures.

It will be understood that, although the terms such as first, second, A, B, and the like may be used herein to describe various elements, these elements should not be limited by these terms. These terms are only used to distinguish one element from another. For example, a first element could be termed a second element, and, similarly, a second element could be termed a first element, without departing from the scope of the disclosure. As used herein, the term "and/or" includes combinations of a plurality of associated listed items or any of the plurality of associated listed items.

It will be understood that when an element is referred to as being "coupled" or "connected" to another element, it can be directly coupled or connected to the other element or an intervening element may be present. In contrast, when an element is referred to as being "directly coupled" or "directly connected" to another element, there is no intervening element present.

As used herein, the singular forms "a", "an" and "the" are intended to include the plural forms as well, unless the context clearly indicates otherwise. It will be further understood that the terms "comprises", "comprising", "includes", "including" and/or "having", when used herein, specify the presence of stated features, integers, steps, operations, constitutional elements, components and/or combinations thereof, but do not preclude the presence or addition of one or more other features, integers, steps, operations, constitutional elements, components, and/or combinations thereof.

Some terms used herein are defined as follows.

A battery cell is a minimum unit that serves to store power and a battery module refers to an assembly in which a plurality of battery cells are electrically connected.

A battery pack or battery rack refers to a system of a single structure which is assembled by electrically connecting module units, set by a battery manufacturer, and can be monitored and controlled by a battery management apparatus/system (BMS). A battery pack or battery rack may include several battery modules and a battery protection unit or any other protection device.

A battery bank refers to a group of large-scale battery rack systems configured by connecting a plurality of racks in parallel. A bank BMS for a battery bank may monitor and control rack BMSs, each of which manages a battery rack.

A battery assembly may include a plurality of electrically connected battery cells and refers to an assembly that functions as a power supply source by being applied to a specific system or device. Here, the battery assembly may mean a battery module, a battery pack, a battery rack, or a battery bank, but the scope of the disclosure is not limited to these entities.

FIG. 1 is a block diagram for explaining a general power supply control device according to aspects of the disclosure.

More specifically, FIG. 1 shows a battery system applied to a device (e.g., electric vehicle, etc.) including a driving unit 40.

Referring to FIG. 1, a typical battery system may include a battery 10, a switching device 20, and a control unit 30.

The switching device 20 is disposed on the power supply path between the battery 10 and the driving unit 40 and is configured to electrically connect or disconnect the battery 10 and the driving unit 40. Here, the switching device 20 may be a Metal Oxide Semiconductor Field Effect Transistor (MOSFET) provided at an output terminal of the battery 10.

The control unit 30 may control whether to supply power by the battery 10 by controlling the switching device 20 to be in a closed state or an open state. Specifically, the control unit 30 controls the switching device 20 to be in a closed state so that the stored power of the battery 10 is supplied to the driving unit 40 and the driving unit 40 can be driven by the supplied power or controls the switching device 20 to be in an open state so that the power supplied from the battery 10 can be blocked. Here, the control unit 30 may be a micro controller unit (MCU) included in a battery management system (BMS).

When an unexpected abnormal state (for example, abnormal reset or shutdown) occurs in the control unit 30 while the driving unit 40 is driven by the power supplied from the battery 10, the power supply to the driving unit 40 may be cut off, causing the driving unit 40 to suddenly stop, which may cause a safety accident.

Aspects of the disclosure relate to a power supply control apparatus and its control method that can maintain power supply by the battery for a certain period of time so that the electric vehicle can stop stably even if an abnormal condition occurs in the control unit of the switching device.

FIG. 2 is a block diagram for explaining a power supply control apparatus according to aspects of the disclosure. In more detail, FIG. 2 shows the battery system 100 applied to a device including a driving device 200.

The battery system 100 according to aspects of the disclosure may be located in a device including the driving device 200 and may supply power to the driving device 200. Here, the device including a driving device may refer to an object driven through electrical energy, such as an electric car, a hybrid car, an electric bike, or an electric bicycle, and the driving device may refer to an object driven through electrical energy.

Referring to FIG. 2, the battery system 100 may include a battery 110 and a power supply control apparatus 120.

The battery 110 may refer to a battery cell or battery assembly. In other words, the battery 110 may mean one or more battery cells, a battery module, a battery pack, a battery rack, or a battery bank.

The power supply control apparatus 120 may be disposed on a power supply path between the battery 110 and the driving device 200 and is a device that may electrically connect or disconnect the battery 110 and the driving device 200. Here, the power supply control apparatus 120 may include a switching device that may be opened and closed by a control signal and one or more controllers that may control the switching device.

The controller included in the power supply control apparatus 120 may control the switching device to be in a closed state or an open state, thereby connecting or blocking the power supply path between the battery 110 and the driving device 200. Specifically, the controller may control the switching device to be in a closed state so that the stored power of the battery 110 is supplied to the driving device 200 and thus, the driving device 200 can be driven using the supplied power, or may control the switching device to be in an open state so that the power supplied from the battery 110 is cut off.

The controllers included in the power supply control apparatus 120 may include a main controller and an auxiliary controller.

The main controller may refer to a main control unit that controls the switching device included in the power supply control apparatus 120. In addition, the auxiliary controller may refer to a sub-control unit that controls the switching device included in the power supply control apparatus 120 in place of the main controller in the instance t abnormality occurs in the main controller.

When the battery system operates in a power supply mode, the main controller may control the switching device to be closed so that the stored power of the battery 110 is supplied to the driving device 200. If an abnormal condition occurs in the main controller while the driving device 200 is being driven using power supplied from the battery 100, the auxiliary controller may substitute the main controller and control the switching device. Here, the abnormal state may mean a state in which an abnormal reset or shutdown of the main controller has occurred.

FIG. 3 is a block diagram for explaining a power supply control apparatus according to aspects of the disclosure.

Referring to FIG. 3, the battery system 100 may include a battery 110 and a power supply control apparatus 120.

The power supply control apparatus 120 may include a switching device 121 that may be opened and closed by a control signal, a main controller 122, and an auxiliary controller 123 that control the switching device.

The switching device 121 may be disposed on a power supply path between the battery 110 and the driving device 200 and may electrically connect or disconnect the battery 110 and the driving device 200.

The switching device 121 may be controlled by control signals from the main controller 122 and the auxiliary controller 123. In other words, when a control signal is transferred from either the main controller 122 or the auxiliary controller 123, the switching device 121 may be opened or closed according to the transmitted control signal.

The main controller 122 may refer to a main control unit that controls the switching device included in the power supply control apparatus 120. Here, the main controller may be a micro controller unit (MCU) included in a battery management system (BMS).

The auxiliary controller 123 may refer to a sub-control unit that replaces the main controller 122 and controls the switching device 121 when an abnormality occurs in the main controller 122. Here, the auxiliary controller may be implemented as a separate integrated circuit (IC) that is separate from the MCU of the battery management system (BMS).

When the battery system operates in a power supply mode, the main controller 122 may control the switching device 121 to be in a closed state. Accordingly, stored power of the battery 110 is supplied to the driving device 200 and the driving device 200 may be driven using the power supplied from the battery 100.

While the driving device 200 is operating, the main controller 122 may determine whether an abnormal state has occurred. Here, the main controller 122 may determine whether an abnormal state has occurred based on state information collected through a state information collection device (not shown) provided in the battery system or based on an abnormal condition occurrence a signal transmitted from a higher-level controller (not shown). According to aspects of the disclosure, the abnormal state may include a state in which an abnormal reset of the main controller or a state in which an abnormal shutdown of the main controller occurs.

When an abnormal condition occurs in the main controller 122, the main controller 122 may transmit a predefined first signal to the auxiliary controller 123. Here, the first signal may refer to a signal for requesting emergency power supply.

When receiving the first signal from the main controller 123, the auxiliary controller 123 may control the switching device 121 to be closed for a predefined period so that emergency power can be supplied to the driving device 200. Here, the time period of emergency power supply may be defined as a specific time (e.g., 20 seconds) or as the time until the driving device 200 is normally stopped. Here, the auxiliary controller 123 may check whether the driving device 200 is stopped through connection with the upper controller or through connection with a controller of the driving device 200.

According to aspects of the disclosure, in the instance that the abnormal state is cleared after the main controller 122 transmits the first signal to the auxiliary controller 123, the main controller 122 may send a predefined second signal to the auxiliary controller 123. Here, the second signal may mean a signal for canceling the emergency power supply request.

When receiving the first signal from the main controller 123, the auxiliary controller 123 may wait for a preset period of time without immediately controlling the switching device 121 to a closed state. Here, in the instance that the second signal is not transmitted from the main controller 123 within a predetermined period of time, the auxiliary controller 123 may control the switching device 121 to be in a closed state for a predefined period and emergency power can be supplied to the driving device 200.

Meanwhile, when the second signal is transmitted from the main controller 123 within a preset period of time, the auxiliary controller 123 may operate in standby mode without outputting a control signal to the switching device 121.

In other words, when an unexpected abnormal condition occurs in the main controller 122, the main controller 122 may notify the auxiliary controller 123 that it is in a dangerous state requiring emergency power supply. In the instance that the auxiliary controller 123 is not notified of the removal of the dangerous state within a certain period of time, the auxiliary controller 123 may control the switching device to provide temporary power supply to the driving device until the driving device is safely stopped.

FIG. 4 is an operational flowchart of the control method of a power supply control apparatus according to aspects of the disclosure.

The power supply control apparatus may include a switching device disposed on a power supply path between the battery and the driving device, a main controller that controls the switching device, and an auxiliary controller.

When the battery system operates in a power supply mode, the main controller may control the switching device to be closed so that stored power of the battery can be supplied to the driving device (S410). Accordingly, the stored power of the battery is supplied to the driving device, and the driving device may be driven using the power supplied from the battery.

While the driving device is operating, the main controller may determine whether an abnormal state has occurred (S420). Here, the main controller may determine whether an abnormal state has occurred based on state information collected through a state information collection device (not shown) provided in the battery system or based on an abnormal condition occurrence signal transmitted from a higher-level controller (not shown).

If an abnormal condition has occurred in the main controller (YES in S420), the auxiliary controller may substitute the main controller and control the switching device (S430).

FIG. 5 is an operational flowchart of a control method of a power supply control apparatus according to aspects of the disclosure.

When the battery system operates in a power supply mode, the main controller may control the switching device to be in a closed state (S510). Accordingly, stored power of the battery can be supplied to the driving device and the driving device may operate using the power supplied from the battery.

While the driving device is operating, the main controller may determine whether an abnormal state has occurred (S520). According to aspects of the disclosure, the abnormal state may include a state in which an abnormal reset of the main controller or a state in which an abnormal shutdown of the main controller occurs.

If an abnormal condition occurs in the main controller (YES in S520), the main controller may transmit a predefined first signal to the auxiliary controller (S530). Here, the first signal may refer to a signal for requesting emergency power supply.

If the abnormal state is resolved after the main controller transmits the first signal to the auxiliary controller, the main controller may transmit a predefined second signal to the auxiliary controller. Here, the second signal may mean a signal for canceling the emergency power supply request.

When a first signal is received from the main controller, the auxiliary controller may wait for a preset period of time.

If the second signal is not transmitted from the main controller within a preset period of time (NO in S540), the auxiliary controller may control the switching device to be closed for a predefined period, so that emergency power can be supplied to the driving device (S550).

If the second signal is transmitted from the main controller within a preset period of time (YES in S540), the auxiliary controller may operate in a standby mode without outputting a control signal to the switching device (S560).

The operations of the method according to aspects of the disclosure may be implemented as a computer-readable program or code on a computer-readable recording medium. The computer-readable recording medium includes all types of recording devices in which data readable by a computer system is stored. In addition, the computer-readable recording medium may be distributed in a network-connected computer system to store and execute computer-readable programs or codes in a distributed manner.

Although some aspects of the disclosure have been described in the context of the apparatus, it may also represent a description according to a corresponding method, wherein a block or apparatus corresponds to a method step or feature of a method step. Similarly, aspects described in the context of a method may also represent a feature of a corresponding block or item or a corresponding apparatus. Some or all of the method steps may be performed by (or using) a hardware device, such as, for example, a microprocessor, a programmable computer, or an electronic circuit.

In the foregoing, the disclosure has been described with reference to examples, but those skilled in the art may appreciate that aspects of the disclosure may be variously corrected and changed within range without departing from the spirit and the area of the disclosure described in the appending claims.

The invention claimed is:

1. A power supply control apparatus located in a battery system which supplies power to a driving device, the apparatus comprising:

a switching device disposed on a power supply path between the battery and the driving device to electrically connect or disconnect the battery and the driving device;

a main controller configured to control whether the battery supplies power to the driving device or not by controlling the switching device; and an auxiliary controller configured to control the switching device instead of the main controller based on an abnormal condition occurring in the main controller while the driving device is operating;

wherein the main controller is further configured to:

transmit a first signal for a request for emergency power supply to the auxiliary controller based on the abnormal condition occurring in the main controller; and transmit a second signal canceling the request for emergency power supply to the auxiliary controller based on the abnormal condition being resolved after the first signal is transmitted; and wherein the auxiliary controller is further configured to operate in a standby mode without outputting a control signal to the switching device based on receiving the second signal within a preset period of time after receiving the first signal.

2. The apparatus of claim 1, wherein the abnormal condition comprises at least one of an abnormal reset or shutdown occurring.

3. The apparatus of claim 1, wherein the auxiliary controller is further configured to control the switching device to be in a closed state to provide emergency power to the driving device based on not receiving the second signal within the preset period of time.

4. The apparatus of claim 1, wherein the auxiliary controller is further configured to control the switching device to be in a closed state until the driving device is stopped based on the abnormal condition occurrings in the main controller while the driving device is operating.

5. A control method of a power supply control apparatus, including a switching device disposed on a power supply path between a battery and a driving device to electrically connect or disconnect the battery and the driving device, a main controller for controlling the switching device, and an auxiliary controller for controlling the switching device instead of the main controller, the method comprising:

controlling, by the main controller, the switching device to supply output power of the battery to the driving device;

controlling, by the auxiliary controller instead of the main controller, the switching device based on an abnormal condition occurring in the main controller while the driving device is operating;

transmitting, by the main controller, a first signal for a request for emergency power supply to the auxiliary controller based on the abnormal condition occurring in the main controller;

transmitting, by the main controller, a second signal canceling the request for emergency power supply to the auxiliary controller based on the abnormal condition being resolved after the first signal is transmitted; and operating, by the auxiliary controller, in a standby mode without outputting a control signal to the switching device based on receiving the second signal within a preset period of time after receiving the first signal.

6. The method of claim 5, wherein the abnormal condition comprises at least one of an abnormal reset or shutdown occurring.

7. The method of claim 5, further comprising controlling, by the auxiliary controller, the switching device to be in a closed state to provide emergency power to the driving device abased on not receiving the second signal within the preset period of time.

8. The method of claim 5, wherein controlling, by the auxiliary controller, the switching device comprises controlling the switching device to be in a closed state until the driving device is stopped based on the abnormal condition occurring in the main controller while the driving device is operating.

9. A non-transitory computer readable medium storing instructions that, when executed by one or more processors, cause the one or more processors to perform a control method of a power supply control apparatus, including a switching device disposed on a power supply path between a battery and a driving device to electrically connect or disconnect the battery and the driving device, a main controller for controlling the switching device, and an auxiliary controller for controlling the switching device instead of the main controller, the method comprising:

controlling, by the main controller, the switching device to supply output power of the battery to the driving device;

controlling, by the auxiliary controller instead of the main controller, the switching device based on an abnormal condition occurring in the main controller while the driving device is operating;

transmitting, by the main controller, a first signal for a request for emergency power supply to the auxiliary controller based on the abnormal condition occurring in the main controller;

transmitting, by the main controller, a second signal canceling the request for emergency power supply to the auxiliary controller based on the abnormal condition being resolved after the first signal is transmitted; and operating, by the auxiliary controller, in a standby mode without outputting a control signal to the switching device based on receiving the second signal within a preset period of time after receiving the first signal.

10. The non-transitory computer readable medium of claim 9, wherein the abnormal condition comprises at least one of an abnormal reset or shutdown occurring.

11. The non-transitory computer readable medium of claim 9, wherein the method further comprises controlling, by the auxiliary controller, the switching device to be in a closed state to provide emergency power to the driving device based on not receiving the second signal within the preset period of time.

12. The non-transitory computer readable medium of claim 11, wherein the method further comprises controlling, by the auxiliary controller, the switching device to be in a closed state until the driving device is stopped based on the abnormal condition occurring in the main controller while the driving device is operating.

* * * * *